Patented Dec. 5, 1939

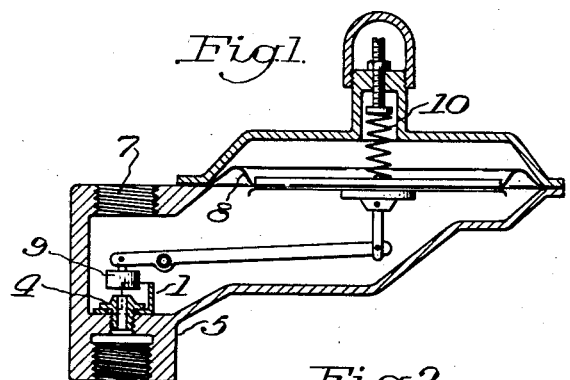
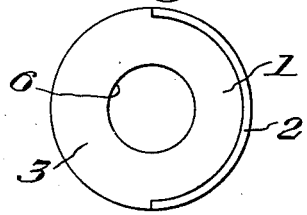
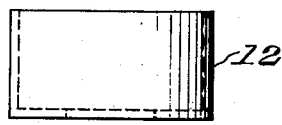
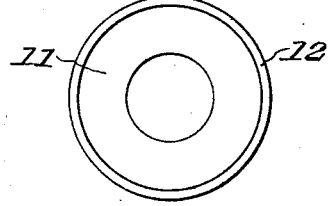

2,182,731

UNITED STATES PATENT OFFICE 2,182,731

PRESSURE REGULATING DEVICE

Charles H. McEaven, Houston, Tex., assignor to Pittsburgh Equitable Meter Company, Pittsburgh, Pa., a corporation of Pennsylvania Application August 23, 1938, Serial No. 226,294

5 Claims. (Cl. 50—26)

This invention relates generally to pressure regulators and more particularly to pressure regulators in which the regulating valve and controlling diaphragm are both located within the same enclosure, and has for its principal object the provision of means for maintaining a more uniform outlet pressure as the rate of flow of the fluid whose pressure is being regulated increases or decreases.

Another object is the provision of a simple, inexpensive and effective device which may be installed in regulators now in use for the aforementioned purpose, without altering the design of such regulators.

This application is a continuation in part of my application for Pressure regulating device, Serial No. 727,265, filed May 24, 1934.

With the above and other objects in view which will appear in the description, my invention resides in a novel construction, combination and arrangement of parts as hereinafter described and more particularly defined by the appended claims, it being understood that such changes as come within the scope of the claims may be made in the embodiment herein disclosed.

Figure 1 is a side sectional view of a preferred embodiment of the invention,

Figure 2 is a plan view of the deflector,

Figure 3 is an elevation of a modification, and

Figure 4 is a plan view of the modification shown in Figure 3.

Referring now in more detail to the drawing, the numeral 1 indicates a deflector which may be made of any material of sufficient strength and hardness to maintain its original shape when in service. The device is shown as having a semi-cylindrical body 2 and has a flat circular flange 3 which may be either a part of the semi-cylindrical part thereof or fastened to said semi-cylindrical part by any suitable means.

The device is held in position by any suitable means, such as by screwing removable valve seat 4 into regulator casing or body 5 through hole 6 in member 1, which, when valve seat 4 is tightened, will clamp the device in place.

The fluid passing through the regulator emerges from under valve member 9 travelling in a direction which is at right angles to the direction it must eventually take in order to be discharged through regulator outlet 7. The fluid impinges on member 1, which acts as a baffle to direct it toward regulator outlet 7. My device relieves diaphragm 8 of the impact pressure due to velocity of the fluid toward the diaphragm, which tends toward a lower pressure under the diaphragm, which in turn allows spring 10 to open valve 9 more than it otherwise would. This reduces the variation in pressure at the outlet of the regulator as the load increases or decreases.

In the modification shown in Figures 3 and 4, the valve seat 4 engages the flange 11 of a cylindrical baffle or sleeve 12 to secure it in position. It will be seen that this modification causes the flow to follow a stream lined flow between the valve and regulator outlet which further reduces the pressure acting on the diaphragm due to the high velocity of the fluid toward the regulator outlet throughout the entire distance between the valve and regulator outlet.

From the foregoing description taken in connection with the accompanying drawing, it will be apparent to those skilled in the art that I provide a novel device for improving the regulating ability of pressure regulators.

I claim:

1. The combination with a pressure regulator having a chamber, an inlet and an outlet for said chamber, said inlet and outlet being substantially in axial alignment; a valve seat threaded in said inlet and having an external annular flange; a valve; a diaphragm in said chamber remote from said inlet and outlet, and operatively connected to said valve; of a deflector having a body and an internal annular flange, the internal annular flange of said body being held against the wall of said chamber by the external annular flange of said valve seat, and the body of said deflector being arranged between said valve and said diaphragm to deflect the fluid between said inlet and outlet away from said diaphragm.

2. The combination with a pressure regulator having a chamber, an inlet and an outlet for said chamber, said inlet and outlet being substantially in axial alignment; a valve seat adjacent said inlet; a valve, a diaphragm in said chamber remote from said inlet and outlet, and operatively connected to said valve; of a deflector having a body held against the wall of said chamber by said valve seat, said body being arranged between said valve and said diaphragm and serving to deflect the fluid passing between said inlet to said outlet away from said diaphragm.

3. In a pressure regulator, the combination with a casing having an inlet and an outlet opening in substantial axial alignment, of a diaphragm in said casing disposed at one side of the common axis of said inlet and outlet openings, a valve seat threaded in said inlet opening and having an external annular flange, a valve member co-operating with said seat and operatively connected with said diaphragm, said valve member and diaphragm being mounted in a common chamber within said casing, and said chamber being clear and unobstructed except for said valve member and connections, so that gas may flow freely therethrough, and a baffle device comprising a hollow cylindrical body having an internal annular flange, said device surrounding said inlet opening and having its internal flange clamped between the external flange of said valve seat and the wall of said chamber, and said valve member being mounted to reciprocate within said device but out of contact therewith, whereby an annular passage between said valve member and the body of said device is provided, and the latter serves to direct the current of gas toward said outlet opening, and prevent it from impinging upon said diaphragm.

4. In a pressure regulator, the combination with a casing having an inlet and an outlet opening in substantial axial alignment, a valve seat threaded in said inlet opening and having an external annular flange, of a diaphragm in said casing disposed at one side of the common axis of said inlet and outlet openings, a valve member co-operating with said inlet and operatively connected with said diaphragm, and a deflector member interposed between said inlet and diaphragm to prevent gas from impinging upon said diaphragm, said deflector member having an internal annular flange secured to said casing under said valve seat flange.

5. In a pressure regulator, the combination with a casing having an inlet and an outlet opening in substantial axial alignment, of a diaphragm in said casing disposed at one side of the common axis of said inlet and outlet openings, a valve member co-operating with said inlet and operatively connected with said diaphragm, and a deflector member comprising a semi-cylindrical shield around said valve to prevent gas from impinging upon said diaphragm.

CHARLES H. McRAVEN.